Figure 1:
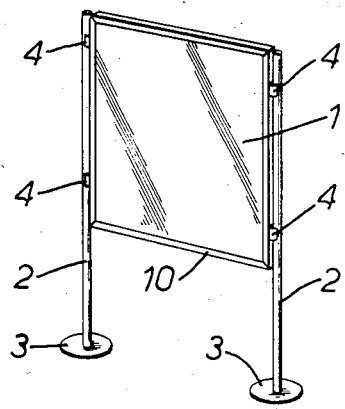

United States Patent [19]
Nimmo et al.

[11] Patent Number: 4,637,178
[45] Date of Patent: Jan. 20, 1987

[54] SCREEN ASSEMBLY AND CLIP THEREFOR

[75] Inventors: Neil D. Nimmo, Hove; Michael Kenny; David Willis, both of Kent, all of England

[73] Assignee: Nimlok Limited, London, England

[21] Appl. No.: 804,221

[22] Filed: Dec. 7, 1985

Related U.S. Application Data

[63] Continuation of Ser. No. 528,917, Sep. 2, 1983, abandoned.

[30] Foreign Application Priority Data

Sep. 3, 1982 [GB] United Kingdom ............... 8225122
Aug. 30, 1983 [GB] United Kingdom ............... 8322902

[51] Int. Cl.$^4$ ........................... A47B 5/00; E04C 2/00
[52] U.S. Cl. ........................ 52/36; 52/238.1; 52/239; 52/243; 160/135; 248/222.2; 248/222.3
[58] Field of Search ............... 52/239, 238.1, 241, 52/243, 79.9, 36; 160/135; 248/222.2, 222.3, 73

[56] References Cited

U.S. PATENT DOCUMENTS 3,154,281 10/1964 Frank .................................. 248/201
3,356,403 12/1967 Sak ..................................... 160/135
3,565,152 2/1971 Cohn .................................. 160/135
4,131,258 12/1978 Okuda ................................. 248/73

FOREIGN PATENT DOCUMENTS 2102834 7/1971 Fed. Rep. of Germany .
2068248 8/1971 France .
1244335 8/1971 United Kingdom .
1270242 4/1972 United Kingdom .
1473644 5/1977 United Kingdom .
1499771 2/1978 United Kingdom .

Primary Examiner—Alfred C. Perham
Attorney, Agent, or Firm—Mason, Fenwick & Lawrence

[57] ABSTRACT

A screen assembly includes at least one panel with slots in its side edges, a plurality of upright poles to which the panel is fastened and a plurality of fastening elements. The fastening elements and the panel are arranged such that a foot portion of a fastening element can be inserted into one of the slots and can then be rotated in the slot about an axis transverse to the slot, whereupon the foot portion becomes progressively more securely clamped in the slot and in a final position is locked to the panel. The fastening element is thus easily fixed to the panel and provides a very secure fixing when so fixed.

24 Claims, 15 Drawing Figures

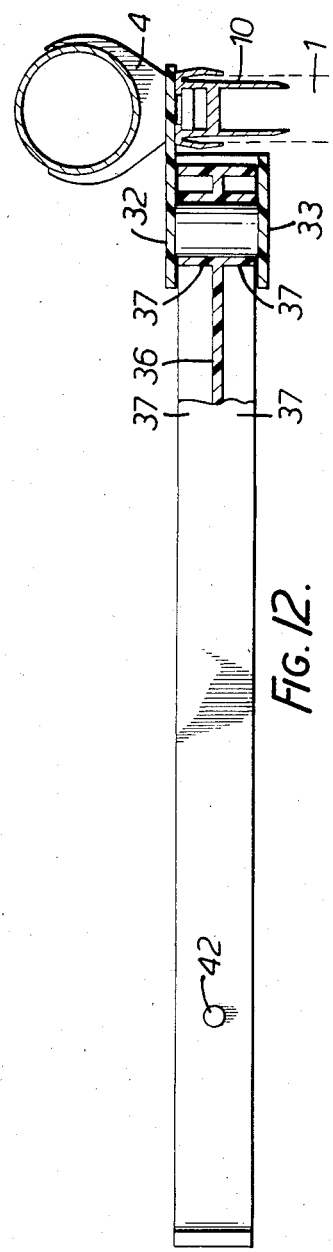
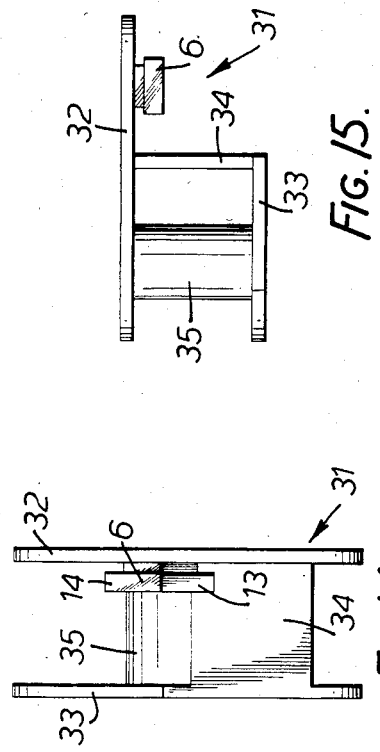
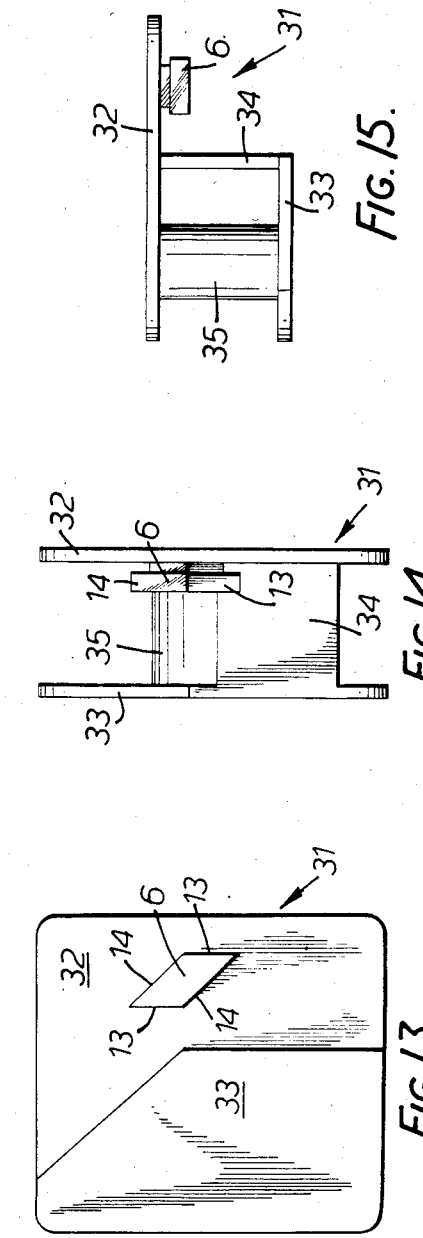

SCREEN ASSEMBLY AND CLIP THEREFOR

This application is a continuation of application Ser. No. 528,917, filed Sept. 2, 1983, now abandoned.

This invention relates to a screen assembly and in particular to a form of clip or other fastener for fastening an upright pole or another member to a panel of such an assembly.

British patent specification No. 1 270 242 describes a screen assembly employing an aluminum clip which is used to fasten a member to an upright pole. The clip is provided with a resilient arcuate portion and a foot portion. The clip is secured to the tube by simply snapping it onto the tube. The clip is secured to the member by a screw or bolt passing through a hole in the base of the clip.

Various other screen assemblies involving somewhat similar clips exist. A disadvantage of such systems is that the clip cannot readily be detached from the panel and the position at which the clip is fixed to the panel is not readily variable.

In a form of display system currently sold by Nimlok Limited under the registered trade mark "Nimlok", the panels of the display system are provided with slots. The foot portion of a clip can be fitted into a slot as a special widened portion, slid along the slot to a desired location and then clamped at that position by a grub screw provided on the clip. With this arrangement the position at which the clip is fixed to the panel can easily be varied. However, in order to vary the position the grub screw must first be loosened and then, after moving the clip to the desired position, tightened. Also special widened portions must be provided in the slot in the panel to enable the foot portion of the clip to be inserted into the slot and the clip must then be slid along the slot to its desired position. It is not possible to fix the clip at the position where the slot is widened.

While alternative systems in which the clip or another fastener was more easily fastened could readily be devised, for example by a snap fastening arrangement, a problem arises in making the fastening sufficiently secure to withstand the forces to which the display system may be subjected. For example, in the case of a clip that is used to connect a display panel to an upright supporting pole, the clip must be fastened to the panel sufficiently strongly to support the weight of the panel and any additional forces that may be applied to the panel. Similarly, in the case of a bracket used to connect a shelf to upright supporting poles, the fastening must support the weight of the shelf and any weight on the shelf.

It is an object of the invention to provide an improved form of screen assembly incorporating an improved fastening arrangement.

According to one aspect of the invention a screen assembly includes at least one panel with slots in its side edges, a plurality of upright poles to which the panel is fastened and a plurality of fastening elements, characterised in that the arrangement of the fastening elements and the panels is such that a foot portion of the fastening element can be inserted into one of the slots and can then be rotated in the slots about an axis transverse to the slot, whereupon the foot portion becomes progressively more securely clamped in the slot and in a final position is locked to the panel.

With such a screen assembly, the fastening element can be inserted into the slot at any location along the slot and with only a simple twisting movement can become firmly secured into the slot.

The fastening element may be moulded from plastics material. This allows the element to be made at low cost and it is found that a good clamping action can be achieved with a plastics element.

The fastening element may be such that in normal use it is urged to rotate beyond said final position. In this case loads on the fastening device during use actually increase the clamping action of the fastening element.

The fastening element may have a substantially flat base to which a clamping head is connected by a neck, the clamping head having a width measured along a first direction less than the width of the slot and a width measured along a second direction greater than the width of the slot. The shape of the head when viewed in a direction perpendicular to the base of the fastening element is generally of parallelogram form with two sides of the parallelogram spaced apart by a distance greater than the width of the slot and the other two sides spaced apart by a distance smaller than the width of the slot.

In an embodiment of the invention the slot is 'T' shaped with the bar of the 'T' defining an interior portion of the slot having longitudinal side walls and the stem of the 'T' defining an outer entrance portion of the slot whose width is reduced by inwardly projecting lips on the panel. The fastening element is arranged to clamp in the slot with two separate clamping actions: wedging of the clamping head against the longitudinal side walls of the slot; and, squeezing of the lips between opposing faces of the base of the fastening element and the clamping head. In another embodiment only the second of these clamping actions is provided.

The base of the fastening element may include a resiliently deformable raised portion which engages one of the lips to effect the squeezing action. A slot may be provided in the base of the fastening element which is able to close up to accommodate deformation of the raised portion. Two such raised portions and slots may be provided.

At least one of the fastening elements may be a bracket including a plate like portion from which the foot portion extends, a slot in the panel being in confronting relationship with the pole and the bracket being such that it can be fastened to said slot without affecting the connection between the panel and pole.

According to another aspect of the invention there is provided a screen assembly including at least one panel with slots in its side edges, a plurality of upright poles and a plurality of clips, each clip comprising an arcuate portion which subtends an angle greater than 180° and is arranged to snap onto a pole, and a foot portion for fastening in one of the slots of a panel, the arrangement of the clips and the panels being such that the foot portion of the clip can be pushed into the slot with the axis of the arcuate portion angled relative to the slot and the clip can then be rotated in the slot until the axis of the arcuate portion becomes aligned with the slot, whereupon the foot portion is securely clamped in the slot.

Preferably the clip is manually rotatable to a position where the arcuate portion is close to alignment with the slot and is further rotatable to the aligned position when two clips are snapped onto a pole and so become aligned with the slot. In this way a particularly strong fixing of the clip to the panel can be achieved.

According to another aspect of the invention there is provided a clip of plastics material for connecting a panel to an upright pole of a screen assembly, the clip comprising a foot portion and a resilient arcuate portion which subtends an angle greater than 180°, the clip having a substantially flat base to which a clamping head is connected by a neck, the clamping head having an overall width measured in a direction perpendicular to the axis of the arcuate portion less than the overall width measured in a direction inclined to said perpendicular direction.

According to yet another aspect of the invention there is provided a bracket of plastics material for connecting in a slot of a panel of a screen assembly, the bracket having a substantially flat plate like portion to which a clamping head is connected by a neck.

Figure 10:
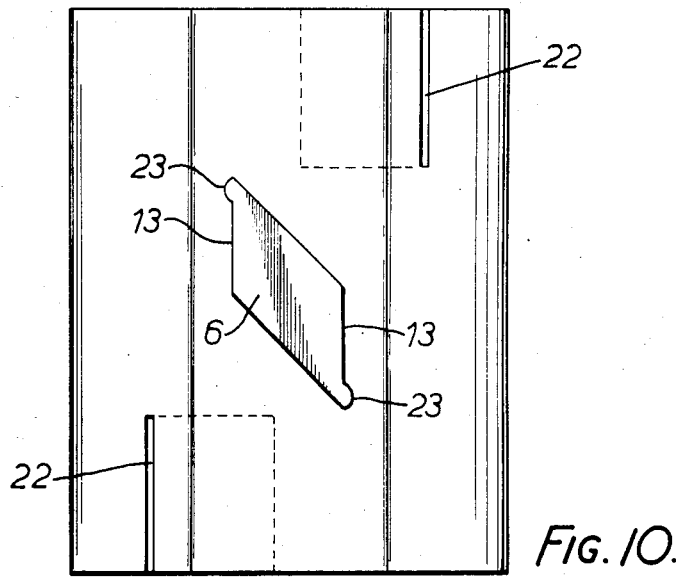
Figure 2:
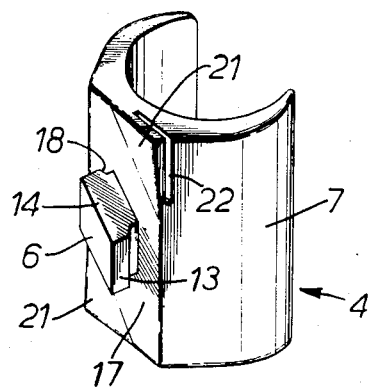
Figure 3:
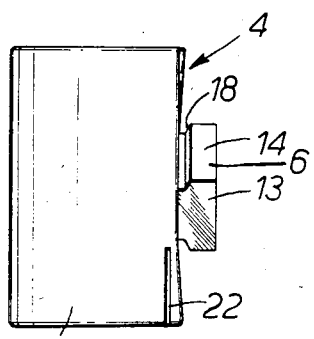
Figure 4:
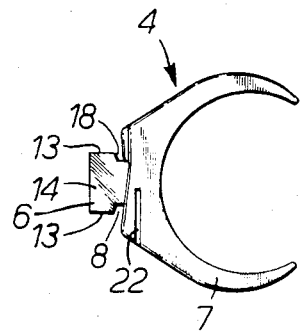
Figure 5:
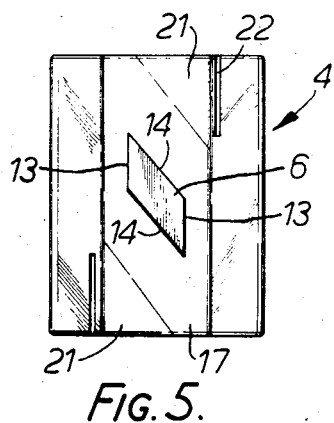
Figure 6:
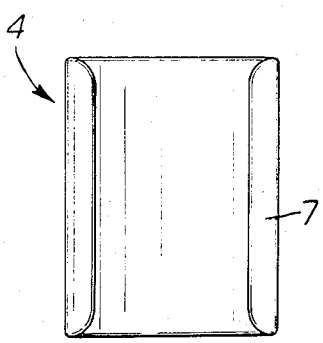
Figure 7:
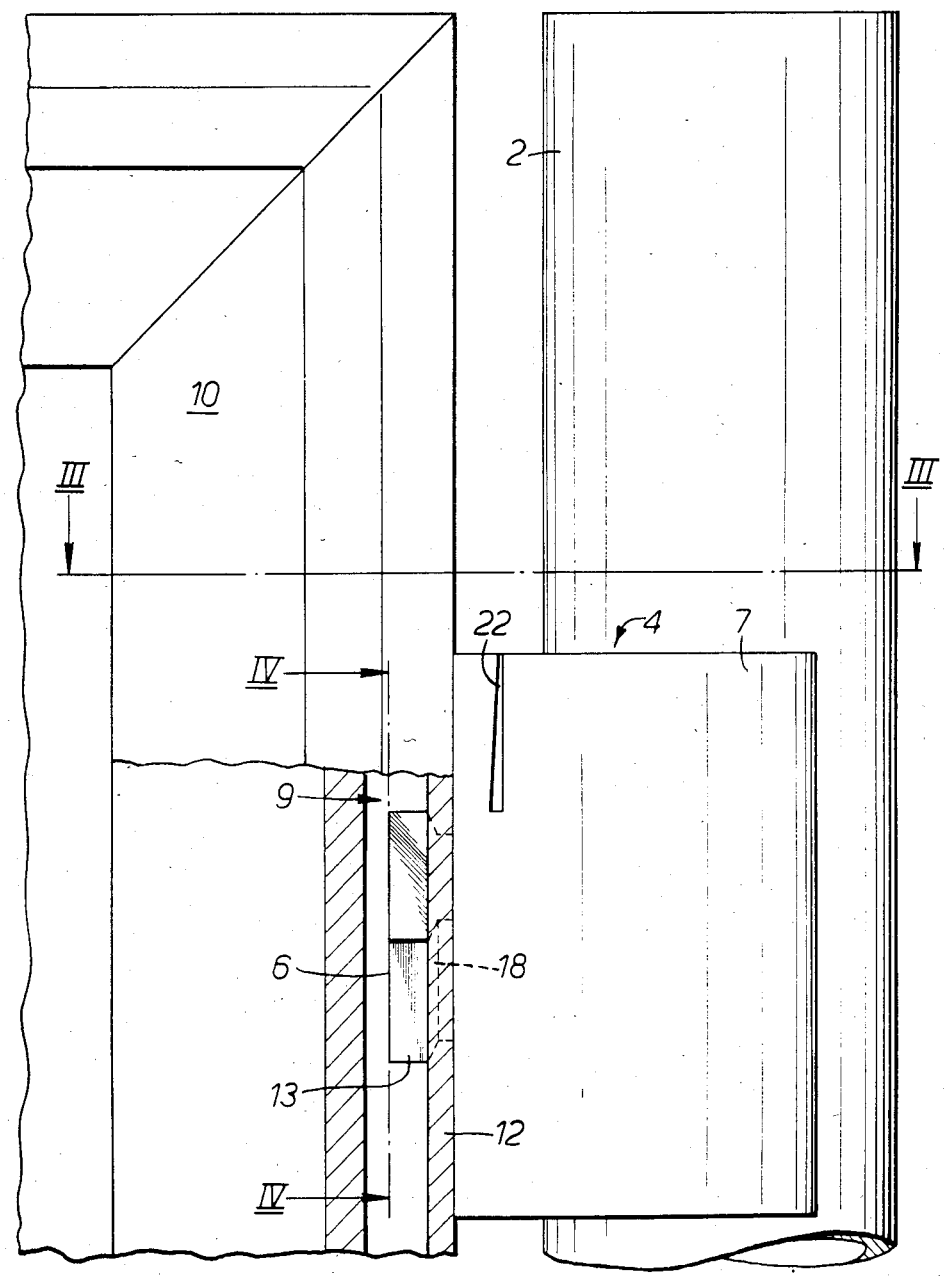
Figure 8:
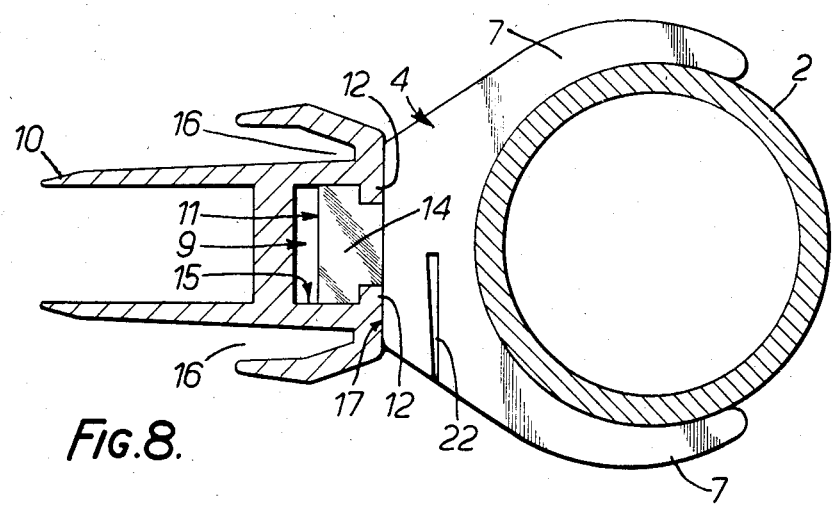
Figure 9:
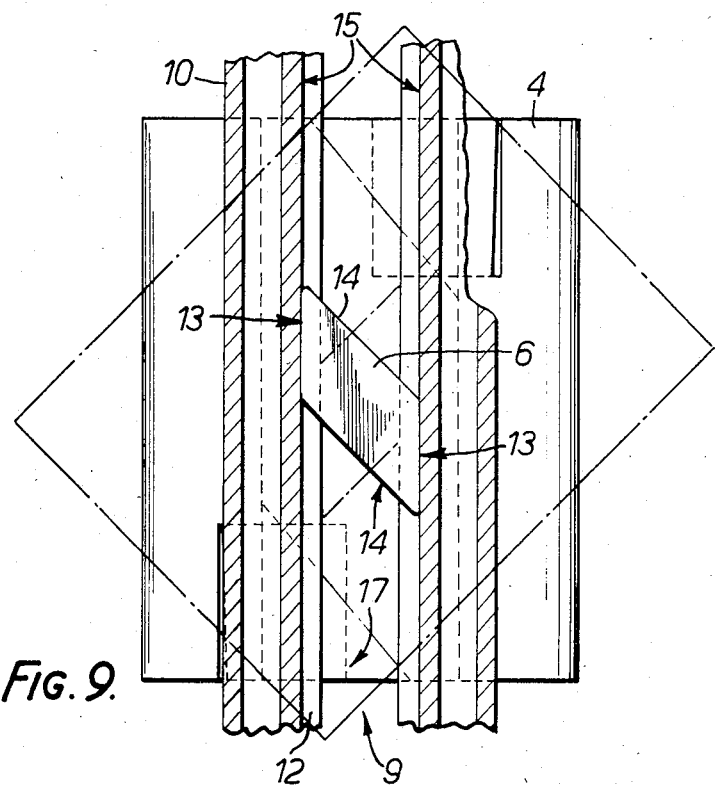
Figure 11:
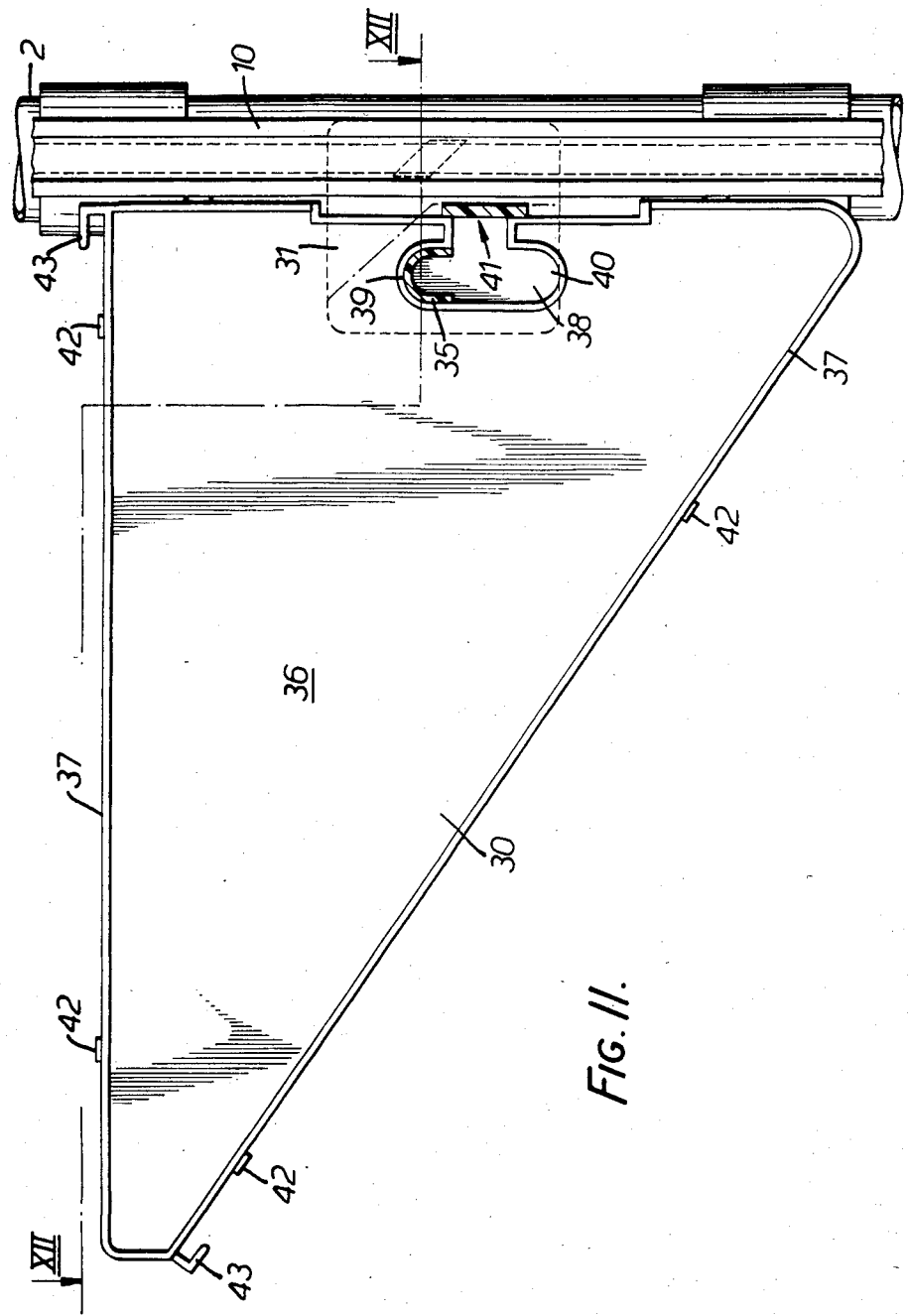

By way of example, an embodiment of the invention will now be described with reference to the accompanying drawings, of which:

FIG. 1 is a perspective view of a screen assembly,

FIG. 2 is a perspective view of a clip used in constructing the assembly of FIG. 1, FIG. 3 is a side view of the clip, FIG. 4 is an end view of the clip, FIG. 5 is an underneath view of the clip, FIG. 6 is a top view of the clip, FIG. 7 is a detailed view of part of the screen assembly of FIG. 1, FIG. 8 is a view along the line III—III of FIG. 7, FIG. 9 is a view along the line IV—IV of FIG. 7, FIG. 10 is an underneath plan view of an advantageous form of clip, FIG. 11 is a side view showing a shelf support fixed by a bracket to the screen assembly of FIG. 1, FIG. 12 is a sectional view along the line XII—XII of FIG. 11, FIG. 13 is a side view of the bracket, FIG. 14 is an end view of the bracket, and FIG. 15 is a plan view of the bracket.

The screen assembly shown in FIG. 1 comprises a panel 1, a pair of upright poles 2 secured in stands 3 and clips 4 fastening the panels 1 to the poles 2.

Referring in particular to FIGS. 7 and 8, each panel 1 has a central area bordered by an aluminum alloy extrusion 10 which provides a rigid frame for the panel and whose section is shown most clearly in FIG. 8. The extrusion has channels 16 in which the edges of the central panel parts are received. The construction of the panel itself is not material to the invention and will not be described further. In FIGS. 7 and 8, for the sake of clarity, only the extrusion part of the panel is shown.

Referring to FIGS. 2 to 6, the clip 4 has a foot portion defined by a clamping head 6 connected to an arcuate portion 7 by a neck 8. The arcuate portion 7 subtends an angle of about 215° and is a snap fit on the pole 2. The clamping head 6 is of parallelogram form with parallel sides 13 of the head spaced apart by a distance greater than the sides 14 of the head. Inclined faces on the top of the head 6 extend upwardly to the neck 8 which is again of parallelogram form. The inclined faces adjoining the sides 13 are designated by the reference numeral 18 in the drawings.

The clip has a base 17 which is generally flat but which has two opposite progressively raised portions 21. A pair of slots 22 are formed in the base 17 underneath each of the raised portions 21.

The clip 4 is moulded from plastics material. In one particular example of the invention the clip 4 is made of a nylon (polyamide material) known as Grilon (Trade Mark) and including 15 percent by weight of glass.

Referring now to FIGS. 7 and 8, which show the clip 4 attached to a panel 1, the clamping head 6 is received in a slot 9 formed in the extrusion 10. As shown in FIG. 8, the slot 9 is 'T' shaped with the bar of the 'T' defining an interior portion 11 of the slot and the stem of the 'T' defining an outer entrance portion whose width is reduced by inwardly projecting lips 12 on the extrusion. The separation of the sides 14 of the head 6 is less than the width of the entrance portion of the slot 9 and the separation of the sides 13 is such that they can just be fitted between the side walls 15 defining the interior portion 11 of the slot. Similarly the neck 8 of parallelogram form is dimensioned such that it can just be fitted between the edges of the lips 12.

The lips 12 have a thickness greater than the spacing between the raised portions 21 and the opposing inclined faces 18 of the head 6 but owing to the slots 22, the raised portions 21 are able to flex away from the inclined faces 18 into the slots 22 to accommodate the lips 12.

In order to attach the clip 4 to the panel, the clip is presented to the extrusion 10 at about the chosen position for attachment, with the clip oriented as shown in chain dotted outline in FIG. 9. In this position the sides 14 of the head are aligned with the slot and the head can therefore be inserted between the lips 12 of the slot until the base 17 of the clip bears against the extrusion. If necessary, the clip can then be slid along the slot to its exact desired location. The clip is then rotated anticlockwise, as seen from behind as in FIG. 9, through an angle of 45 degrees to the solid line position shown in FIG. 9 in which the clip is firmly locked to the extrusion. It will be seen that substantial further rotation of the clip is impossible owing to the engagement of the sides 13 with the walls 15 of the slot and the engagement of the sides 18 with the lips 12. The clip is secured in this position by progressive squeezing of the lips 12 between the base 17 and the inclined faces 18 of the head 6 as the clip is rotated into its clamped position. This clamping action ensures that the clip is fastened very firmly to the extrusion 10. Furthermore since the clamping parts of the clip undergo a substantial deformation during clamping the effectiveness of the clamping is not too dependent on the exact dimensions of the extrusion and considerable tolerances in the extrusion are allowable.

Once the clip 4 is secured to the panel 1 the panel can be secured to the pole 2 simply by snapping the arcuate portion of the clip onto the pole. The relative sizing of the arcuate portion of the clip and the pole is quite critical to achieving a fastening which can easily and repeatedly be made or released and which when made is secure. In one particular embodiment, the pole has an external diameter of 32 mm and the distal ends of the arcuate portion of the clip are spaced apart by 27.3 mm.

In order to dismantle the screen assembly the parts can be separated by following the procedure described above in reverse.

While FIG. 1 shows a single screen assembly consisting of one panel and a pair of upright poles 2 it is possible to extend this assembly without limit. One or more further panels may be attached to either of the poles shown in FIG. 1, with the clips of the panels secured to the poles at different levels. In this way a screen assembly consisting of, for example, a hexagon of panels may be assembled. It is also possible to extend the height of the poles, for example in the manner described in British patent specification No. 1 270 242, and further panels can be attached at a higher level.

FIG. 10 illustrates an advantageous form of the clip in which the sides 13 of the clamping head 6 are provided with protruding pips 23, whose spacing perpendicular to the axis of the clip is slightly greater than the separation of the side walls 15. The effect of this inclination is that when the clamping head is rotated to a position in which the pips 23 engage the side walls 15, the clip is still slightly misaligned with the extrusion 10. When a pair of clips are attached to the extrusion 10 and subsequently fastened to a pole 2, they are forced into alignment with the pole and therefore also with the extrusion 10. The effect of this is to force the protruding pips 23 strongly against the walls 15 of the slot and thereby enhance the fixing of the clip to the extrusion. It will be understood that as an alternative to providing pips the sides 13 may be inclined outwardly at the ends where the pips would be provided.

In the embodiment described above the clamping head 6 is arranged so that the clip is rotated anti-clockwise, as seen from behind as in FIG. 9, to secure the clip. It will be understood that the head 6 could alternatively be arranged as a mirror image of that shown so that the clip would be rotated clockwise, as seen from behind, to secure the clip.

It is thus possible to provide a screen assembly which can very quickly be assembled and dismantled. The screen assembly is particularly suitable for providing a display or presentation.

Accessories, such as light fittings, shelves and table tops may be provided in addition to the panels, poles, stands and clips. FIGS. 11 to 15 illustrate how a shelf support 30 can be attached to the screen assembly by a bracket 31. Referring primarily to FIGS. 13 to 15, the bracket 31 is made in one piece of plastics material and comprises a main plate-like part 32 to which a foot portion defined by a clamping head 6 is secured, a subsidiary plate-like part 33, a straight bridge 34 and a bridge 35 of 'U' cross-section, the two bridges holding the parts 32, 33 in spaced parallel relationship. The clamping head of the bracket 31 is substantially the same as the clamping head of the clip previously described and the same reference numerals are used to designate corresponding parts.

The shelf support 30 is of generally right angled triangular shape, is made in one piece of plastics material and has a central panel 36 around the periphery of which a double flange 37 is provided. Along its shortest side an opening 41 leading into a recess 38 is provided in the panel. The recess has two opposite curved ends 39, 40 each of which match the 'U' cross-section of the bridge 35.

To attach the shelf support to the screen assembly the bracket 31 is first attached to the panel 1. The bracket is introduced with the end carrying the clamping head 6 as the leading end between the panel 1 and the adjacent pole 2. It will be noted that the width of the leading end of the bracket is relatively small and this enables it to pass between the pole and the panel. Once the clamping head 6 is located in the gap between the panel 1 and the adjacent pole 2 it can be introduced into the slot 9 with the bracket tilted clockwise from the position shown in FIG. 13; as it is then rotated back to the orientation shown in FIG. 13, it progressively squeezes the lips 12 of the extrusion 10 and thus fastens the bracket to the extrusion.

The shelf support is then fitted on to the bracket by passing the opening 41 in its shortest side over the bridge 35 and then allowing the support to slide downwardly until the bridge 35 rests against the curved end 39 of the recess. This position of the parts is shown in FIG. 11. It will be seen that any downward pressure on the shelf support urges the bracket to rotate further in the fastening direction and therefore enhances the clamping of the bracket to the panel.

It will be understood that in use brackets and shelf supports would be used in pairs and connected to opposite side edges of a panel. A shelf (not shown) would be placed on top of the supports and for this purpose locating pips 42 are provided on the double flange 37 to engage in corresponding recesses in the shelf and a lip 43 is provided to hold down one edge of the shelf. As can be seen from FIG. 11 the shelf can, if desired, be used the opposite way up; in this case the bridge 35 rests against the curved end 40 of the recess and a sloping shelf support is provided with pips 42 and a lip 43 for locating a shelf thereon.

While the shelf supports 30 on opposite sides of the panel are of identical construction it will be appreciated that "right hand" and "left hand" brackets 31 have to be provided for the opposite sides of the panel. If desired the brackets may be marked to indicate whether they are "right hand" or "left hand".

In the drawings a shelf support 30 is shown fastened to the bracket 31 but it should be understood that other devices, for example lights could be secured to the brackets. Also such devices may incorporate a bracket such as the bracket 31 as an integral part rather than as a separate component.

What is claimed is:

1. A screen assembly including at least one panel with slots along its side edges, a plurality of upright poles and a plurality of fastening elements which engages the upright poles and fasten the panel to the poles with the panel edges in confronting relationship to the poles, wherein the arrangement of the fastening elements and the panel is such that a foot portion of each fastening element can be inserted into a slot until a base of the fastening element abuts the side edge of the panel and can be rotated in the slot about an axis transverse to the slot, whereupon the foot portion becomes progressively more securely clamped in the slot and in a final position is locked to the panel.

2. An assembly as claimed in claim 1 wherein each fastening element is arranged such that in normal use it is urged to rotate beyond said final position.

3. An assembly as claimed in claim 1 wherein each fastening element has a substantially flat base to which a clamping head is connected by a neck, the clamping head having a width measured along a first direction less than the width of the slots and a width measured along a second direction greater than the width of the slots.

4. An assembly as claimed in claim 1 wherein the head when viewed in a direction perpendicular to the base of the fastening element is generally of parallelogram form with two sides of the parallelogram spaced apart by a distance greater than the width of the slots and the other two sides spaced apart by a distance smaller than the width of the slots.

5. An assembly as claimed in claim 1 wherein each slot is 'T' shaped with the bar of the 'T' defining an interior portion of the slot having longitudinal side walls and the stem of the 'T' defining an outer entrance portion of the slot whose width is reduced by inwardly projecting lips on the panel.

6. An assembly as claimed in claim 5 wherein a clamping action is provided by engagement of the foot portion with the longitudinal side walls of the slot.

7. An assembly as claimed in claim 5 wherein a clamping action is provided by squeezing of the lips between opposing faces of the base of each fastening element and the foot portion.

8. An assembly as claimed in claim 7 wherein the base of the fastening element includes a resiliently deformable raised portion which comes into engagement with one of the lips as the fastening element is rotated towards the final position to effect the squeezing action.

9. An assembly as claimed in claim 8 wherein a slot is provided in the base of the fastening element which is able to close up to accommodate deformation of the raised portion.

10. An assembly as claimed in claim 1, wherein each fastening element is moulded from plastics material.

11. An assembly as claimed in claim 1 including further fastening elements in the form of brackets, each bracket including a plate like portion from which a foot portion extends, the foot portion being fastenable in said slot with said plate like portion extending outwards between the adjacent panel and pole without affecting the connection between said adjacent panel and pole.

12. An assembly as claimed in claim 11 wherein shelf supports are fastened to the brackets.

13. An assembly as claimed in claim 11 wherein the foot portion of each of said further fastening elements comprises a clamping head connected to the plate like portion by a neck, the clamping head having a width measured along a first direction less than the width of the slots and a width measured along a second direction greater than the width of the slots.

14. An assembly as claimed in claim 13 wherein the clamping head when viewed in a direction perpendicular to the plate like portion is generally of parallelogram form with two sides of the parallelogram spaced apart by a distance greater than the width of the slots and the other two sides spaced apart by a distance smaller than the width of the slots.

15. An assembly as claimed in claim 1 in which the fastening elements are clips, each of which has an arcuate portion arranged to snap onto a pole to fasten the clip to the pole.

16. A screen assembly including at least one panel with slots along its side edges, a plurality of upright poles and a plurality of clips, each clip comprising an arcuate portion which extends through an angle greater than 180° and is arranged to snap onto a pole, and a foot portion for fastening in one of the slots of a panel, the arrangement of the clips and the panels being such that the foot portion of the clip can be pushed into the slot with the axis of the arcuate portion angled relative to the slot and the clip can then be rotated in the slot until the axis of the arcuate portion becomes aligned with the slot, whereupon the foot portion is securely clamped in the slot.

17. An assembly as claimed in claim 16 further characterized in that each clip is manually rotatable to a position where the arcuate portion is close to alignment with the slot and is further rotatable to the aligned position when two clips are snapped onto a pole and so become aligned with the slot.

18. A clip of plastics material for connecting a panel to an upright pole of a screen assembly, the clip comprising a foot portion and a resilient arcuate portion which extends through an angle greater than 180°, the clip having a substantially flat base to which a clamping head is connected by a neck, the clamping head having an overall width measured in a direction perpendicular to the axis of the arcuate portion greater than the overall width measured in a direction inclined to said perpendicular direction.

19. A clip as claimed in claim 18 wherein the clamping head when viewed in a direction perpendicular to the base of the clip is generally of parallelogram form with two sides of the parallelogram substantially parallel to the axis of the arcuate portion of the clip and spaced apart by a distance greater than the spacing of the other two sides of the parallelogram.

20. A display system including;
a plurality of panels,
a plurality of upright poles, and
a plurality of chips for fastening the panels to the poles,
each panel having upright side edges along which slots are provided, the slots being in confronting relationship to the poles,
each slot being 'T' shaped with the bar of the 'T' defining an interior portion of the slot having longitudinal side walls and the stem of the 'T' defining an outer entrance portion of the slot whose width is reduced by inwardly projecting lips on the panel,
each clip having a base from which extends an arcuate portion which subtends an angle greater than 180° and is snap fitted to one of said plurality of upright poles, and a clamping head connected by a neck to the base, the clamping head having a width measured along a first direction less than the width of the outer entrance portion of each slot and a width measured along a second direction greater than the width of the interior portion of each slot, whereby each clip can be pushed into a slot with the axis of the arcuate portion angled relative to the slot and the clip can then be rotated in the slot until the axis of the arcuate portion becomes aligned with the slot, whereupon the clamping head is securely clamped in the slot.

21. A display system including;
a plurality of panels,
a plurality of upright poles, and
a plurality of clips which fasten the panels to the poles,
each panel having upright side edges along which slots are provided, the slots being in confronting relationship to the poles,
each slot being "T" shaped with the bar of the "T" defining an interior portion of the slot having longitudinal side walls and the stem of the "T" defining an outer entrance portion of the slot whose width is reduced by inwardly projecting lips on the panel,
each clip having a base from which extends an arcuate portion which subtends an angle greater than 180° and is snap fitted to one of said plurality of upright poles, and a clamping head connected by a neck to the base, the clamping head having a width measured along a first direction less than the width of the outer entrance portion of each slot and a width measured along a second direction greater than the width of the interior portion of each slot, whereby each clip can be pushed into a slot with the axis of the arcuate portion angled relative to the slot and the clip can then be rotated in the slot until the axis of the arcuate portion becomes parallel with the slot and the clamping head engages the side walls of the interior portion of the slot preventing further rotation of the clip, whereupon the clip is securely clamped to the slot, the clips being prevented from rotating relative to the panels once the display system is fully assembled by virtue of the engagement of the arcuate portions of the clips with the poles.

22. A display system according to claim 21 in which the clamping head when viewed in a direction perpendicular to the base of the fastening element is generally of parallelogram form with two sides of the parallelogram spaced apart by a distance greater than the width of the entrance portion of the slot and the other two sides spaced apart by a distance smaller than the width of the slot.

23. A display system including at least one panel with slots along its side edges, a plurality of upright poles and a plurality of clips which engage the upright poles and fasten the panel to the poles with the panel edges in confronting relationship to the poles, each clip being made in one piece from plastics material and comprising an arcuate portion which extends around a central axis at a substantially constant radius through an angle greater than 180°, and a foot portion, wherein the arrangement of the clips and the panel is such that a foot portion of each clip can be inserted into a slot with the axis of the arcuate portion angled relative to the slot and can be rotated in the slot about an axis transverse to the slot, whereupon the foot portion becomes progressively more securely clamped in the slot and in a final position, with the axis of the arcuate portion parallel with the slot and with the foot portion engaging the side walls of the slot to prevent further rotation of the foot portion, is fixedly clamped to the panel.

24. A display system including:
a plurality of panels,
a plurality of upright poles, and
a plurality of clips which fasten the panels to the poles, each panel having upright side edges along which slots are provided, the slots being in confronting relationship to the poles, each slot being "T" shaped with the bar of the "T" defining an interior portion of the slot having longitudinal side walls and the stem of the "T" defining an outer entrance portion of the slot whose width is reduced by inwardly projecting lips on the panel, each clip being moulded in one piece from plastics material and having a substantially flat base to which a clamping head is connected by a neck and an arcuate portion which extends around a central axis at a substantially constant radius through an angle greater than 180°, the arcuate portions being snap fitted to said plurality of upright poles, the clamping head of each clip having a width measured along a first direction parallel to the base of the clip less than the width of the outer entrance portion of each slot and a width measured along a second direction parallel to the base of the clip greater than the width of the interior portion of each slot, whereby each clip can be pushed into a slot with the axis of the arcuate portion angled relative to the slot and the clip can then be rotated in the slot until the axis of the arcuate portion becomes parallel with the slot whereupon the clip is securely clamped to the slot with the clamping head engaging the side walls of the interior portion of the slot preventing further rotation of the clip and with the lips of the slot jammed between the clamping head and the base of the clip, and the clips being prevented from rotating relative to the panels once the display system is fully assembled by virtue of the engagement of the arcuate portions of the clips with the poles.

* * * * *